Figure 4:
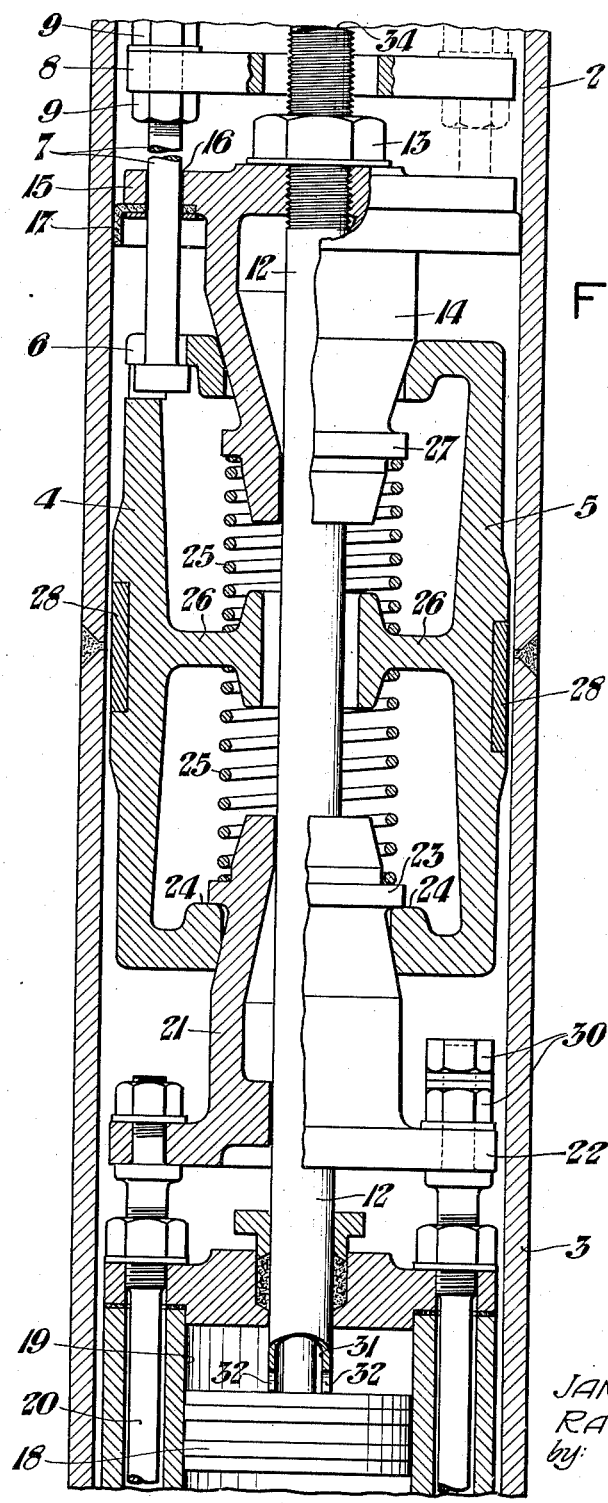

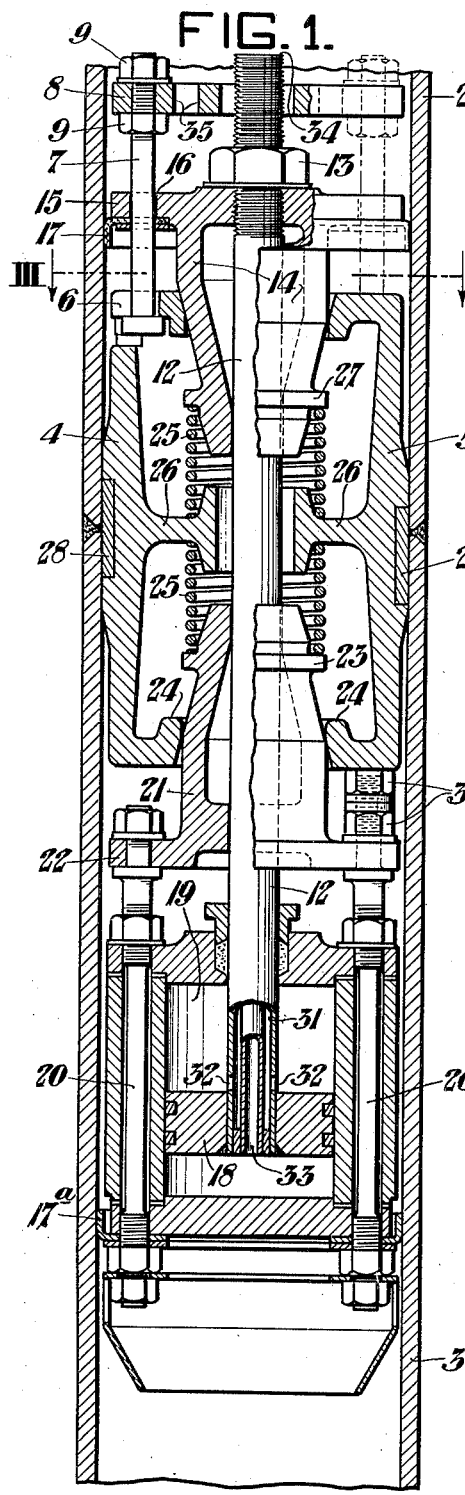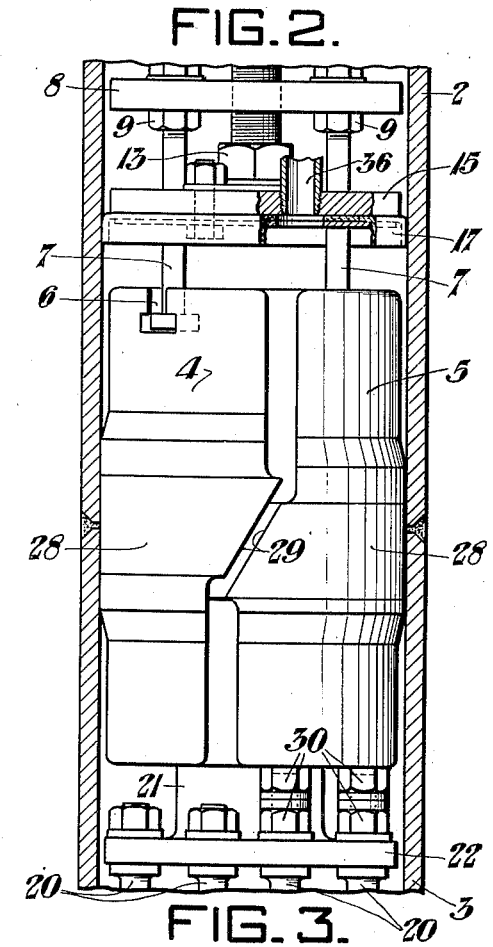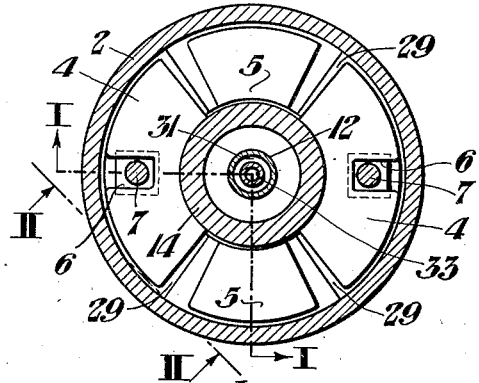

Patented Aug. 1, 1939

2,167,886

UNITED STATES PATENT OFFICE 2,167,886

APPARATUS FOR ALIGNING, WELDING, AND TESTING PIPE JOINTS

James B. Graham, Mount Lebanon, and Raoul G. Mayer, Wilkinsburg, Pa., assignors to National Tube Company, a corporation of New Jersey Application July 15, 1937, Serial No. 153,864

4 Claims. (Cl. 113—102)

This invention relates to apparatus for aligning abutting sections of pipe preparatory to welding the sections together.

An object of this invention is to provide an aligning apparatus that can be used on the inside of the pipe and provide unobstructed access to the outside of the joint for welding the abutting sections together.

Another object is to provide an apparatus that will hold the pipe sections rigidly in aligned position during the welding operation.

A further object is to provide means for chilling the weld metal at the point of penetration.

A still further object is to provide means in combination with the aligning apparatus whereby the strength of the welded joint may be tested.

Other objects and advantages will become apparent as the description proceeds, in which:

Figure 1 is a section on line I—I of Figure 3,
Figure 2 is a section on line II—II of Figure 3,
Figure 3 is a section on line III—III of Figure 1, and
Figure 4 is an enlarged detailed sectional view, similar to Figure 1 but illustrating the position of the apparatus within the pipe in collapsed position.

In the drawings, the numerals 2 and 3 represent abutting sections of pipe to be properly aligned by the present invention preparatory to welding said sections together.

The apparatus for aligning the abutting pipe sections comprises a hollow segmental cylinder including segments 4 and 5. Each of the segments 4 is provided with a slot 6 on its upper face to receive therein the headed end of bolts 7 which are adjustably secured to a spider or supporting plate 8 by means of the nuts 9. The supporting plate or spider 8 is provided with a central aperture through which a piston-rod 12 is loosely fitted.

Rigidly secured to the piston-rod 12 by any desired means, but illustrated as a nut 13 in this instance, is a plug 14 provided with a flange 15, said flange having apertures 16 through which said bolts 7 are adapted to pass. Upon the bottom face of said flange is provided a sealing means 17 which is secured to said flange in any conventional manner. This sealing means may be a cup made from leather, or any other suitable material, to form a seal with the inner walls of said pipe section and prevent leakage of the pressure fluid when the apparatus is used for testing the strength of the welded joint, as will be hereinafter described.

Mounted on the end of piston-rod 12, in any desired manner, is a piston 18 movable within a cylinder 19. A sealing means 17a similar to that secured to the flange 15 is attached to the bottom face of said cylinder 19 by means of the bolts 20 which extend through said cylinder and flange 22 on a plug 21 so as to rigidly connect said cylinder with said plug 21 for integral movement. The plug 21 is provided with an annular flange 23 adapted to engage the inwardly extending flange 24 formed on said segments 4 and 5 when in collapsed or non-aligning position, in order that said plug and cylinder can be supported by said segments.

Positioned between the plugs 14 and 21 and encompassing the tapered ends of said plugs are equalizing springs 25, each of which contact each side of the inwardly extending T-shaped flanges 26 formed on said segments 4 and 5.

The opposite ends of the equalizing springs rest upon the annular flanges 23 and 27 formed on and tapered end of the plugs and thereby maintain said plugs spaced an equal distance when the apparatus is collapsed within the abutting pipe sections, at the same time maintaining the segments in contact with the tapered end of said plugs. In collapsed position, as shown in Figure 4, the plug 21 is moved so that the annular flange 23 engages the inwardly extending flange 24 formed on the segments 4. In such position, the flange 24 supports said plug 21 and cylinder 19 within the abutting pipe sections.

The segments 4 and 5 are provided with grooves within which are positioned chill rings 28. These chill rings may be copper or any other metal having a greater heat conductivity than the metal of said segments 4 and 5. The edges of the segments 4 and 5 are offset in a vertical plane with respect to each other so that the contact faces of said chill rings are disposed at an angle to the transverse plane of the segments, as shown at 29 in Figure 3.

Secured to the flange 22 formed on the plug 21 are adjustable nuts 30. The plugs 14 and 21 have their ends tapered in such a manner that, during the movement of these plugs toward each other, they expand the segments 4 and 5 so as to contact the inner walls of the abutting pipe sections 2 and 3 and upon the final upward stroke of segments 5, by the nuts 30, the inclined faces of the chill ring are brought into engagement to effect a wedging action of the segments 4 and 5 and force the abutting pipe sections 2 and 3 into alignment so that they may be rigidly held in place during the welding operation.

The piston-rod 12 contains two longitudinal conduits separated from each other for the transmission of fluid pressure to the opposite sides of the piston 18. Through the passageway 31, fluid pressure may enter on one side of the piston 18 through the openings 32, while pressure may be applied to the other side of the piston through the passageway 33. The main source of fluid pressure supply is admitted through the top of the piston-rod at 34.

The supporting plate 8 is provided with openings 35 to receive the cable, not shown, for suspending the apparatus within said pipe sections.

When it is desired to align the abutting ends of pipe sections, the aligning apparatus is suspended within the pipe sections 2 and 3 by means of a wire cable or the like, secured in any conventional manner through the openings 35 formed in the supporting plate 8. After the segments 4 and 5 and the plugs and cylinder have been positioned within the abutting pipe sections, fluid pressure is admitted to the piston-rod 12 at 34 so that pressure will be admitted to the cylinder 19 through the ports 32. Due to the fact that the cylinder 19 is rigidly secured to the plug 21 and the piston 18 rigidly connected to the plug 14 through the piston-rod 12, pressure will be exerted upwardly upon the cylinder 19 for moving the plug 21 upwardly, while pressure will be applied to the piston 18 for moving the same downwardly and, due to the plug 14 being rigidly secured to the piston-rod 12, said plug 14 will move downwardly toward the upwardly moving plug 21, thus drawing these plugs toward each other. This movement of the plugs 14 and 21 toward each other will carry with them the segments 4 and 5, but as the plugs 14 and 21 continue their movement toward each other, they will, due to the conical shape of their tapered ends, expand said segments 4 and 5 transversely of the movement of the plugs so as to contact the segments 4 and 5 with the inner walls of the abutting pipe sections 2 and 3. Due to the irregular shape of the plug 14, as shown in Figures 1 and 4, its surface has a different conical shape from the surface of the plug 21. This prevents longitudinal movement of the segments 4 but, as movement of the cylinder 19 continues to move the plug 21 toward the plug 14, the segments 5 are contacted by the adjustable nuts 30 carried by the flange on plug 21 and given the final upward stroke to segments 5. This results in closing the gap between the inclined faces formed on the chill rings 28 and thereby properly aligns the abutting ends of pipe sections 2 and 3 to maintain said pipe sections rigidly in place during the welding operation.

By such a construction as hereinabove described, the segments 4 and 5, when expanded, form a continuous cylindrical surface in contact with the inner walls of the pipe sections. Furthermore, by the alignment of abutting pipe sections, in accordance with the present invention, there is produced in unobstructed access to the outside of the joint for welding purposes and, due to the chill rings being in direct contact with the weld and having a greater heat conductivity than the segments 4 and 5, the weld is chilled and its penetration of the tube is prevented.

When it is desired to test the welded joint, the segments 4 and 5 are contracted to disengage the inner walls of the abutting pipe sections 2 and 3 and any suitable testing fluid under the required pressure is admitted, through the inlet pipe 36, to the space between the upper and lower cups 17. The cups 17 which are made of leather, or any other suitable material, form cells to prevent leakage of the pressure fluid admitted through the pipe 36.

The apparatus of the present invention may, if desired, be used as a grapple for lifting the casing lying horizontally in the stock pile to a vertical position for subsequent alignment with an adjacent pipe section. When it is desired to lift a pipe section from the stock pile, the segmental sleeve is inserted through the pipe and positioned adjacent the end thereof, and the cable extending to the derrick is wound upon a conventional type drum. The pressure is admitted to the cylinder in the manner hereinbefore described to expand the segmental sleeve to engage the inner wall of the pipe section and form a rigid clamp for said pipe section whereby, upon further rotation of the drum, the pipe section is lifted from its horizontal position in the stock pile to a vertical position whereby it may be properly aligned with the adjacent section of pipe within the well.

While we have shown and described specific embodiments of the present invention, it is to be understood that we do not wish to be limited exactly thereto, since various modifications may be made without departing from the scope of the invention as defined by the following claims.

We claim:

1. An apparatus for aligning abutting pipe sections comprising a cylinder, a piston rod, a piston carried by said piston rod and operable within said cylinder, plugs connected to said cylinder and piston rod respectively, segmental sleeves adapted to engage said plugs, and means adapted to move said plugs and expand said segmental sleeves into contact with the inner walls of abutting pipe sections whereby said pipe sections are aligned for joint welding.

2. An apparatus for aligning abutting ends of pipe sections preparatory to welding comprising a segmental sleeve, means for suspending said segmental sleeve within said pipe sections, tapered conical plugs cooperating with said segments of said sleeve, a cylinder, a piston rod, a piston on said piston rod, means for supporting said piston rod, means for supporting said cylinder and fluid pressure means for moving said piston and cylinder to advance said plugs toward each other whereby said segmental sleeve is expanded into contact with the inner walls of said pipe sections to hold said pipe sections rigid during the welding operation.

3. A grapple for pipe comprising a segmental sleeve, tapered conical plugs cooperating with segments of said sleeve for expanding said segmental sleeve to engage the inner wall of said pipe whereby said pipe may be conveyed from one position to another position, spring means supported on said segmental sleeve and contacting said plugs for maintaining said tapered conical plugs equally spaced from each other when said sleeve is in collapsed position.

4. In combination with an apparatus for aligning pipe sections for welding, means for testing the strength of the welded pipe joint comprising annular members on each end of said aligning apparatus, sealing means carried by said annular members and contacting the inner walls of the pipe sections and means on one of said annular members for supplying fluid under pressure into the area between said annular members whereby pressure within said area is transmitted to the welded joint to determine its strength.

JAMES B. GRAHAM.
RAOUL G. MAYER.